United States Patent [19]
Weber

[11] Patent Number: 5,597,980
[45] Date of Patent: Jan. 28, 1997

[54] DETACHABLE MOUNTING MECHANISM FOR A FUEL INJECTOR WIRING HARNESS COVER

[75] Inventor: Kenneth A. Weber, Livonia, Mich.

[73] Assignee: Yazaki Corporation, Tokyo, Japan

[21] Appl. No.: 347,509

[22] Filed: Nov. 30, 1994

[51] Int. Cl.⁶ .................................................... H02G 3/04
[52] U.S. Cl. .................. 174/72 A; 174/48; 174/68.3; 123/143 C; 248/68.1; 138/106
[58] Field of Search ................................ 174/101, 72 A, 174/48, 68.3, 95, 97, 99 R; 123/456, 469, 470, 143 C; 248/68.1, 71, 503, 507; 138/106, 112

[56] References Cited

U.S. PATENT DOCUMENTS

| | | | |
|---|---|---|---|
| 4,864,082 | 9/1989 | Ono et al. | 174/97 |
| 5,024,251 | 6/1991 | Chapman | 138/92 |
| 5,332,866 | 7/1994 | Sawamura | 174/101 |

FOREIGN PATENT DOCUMENTS 61-22124  2/1986  Japan .

Primary Examiner—Hyung S. Sough
Attorney, Agent, or Firm—Young & Basile, P.C.

[57] ABSTRACT

The present invention provides a detachable mounting mechanism for a fuel injector wiring harness cover. The cover is detachably mounted to a fuel injector assembly such as a fuel injector rail. The cover includes a base which has a channel for receiving the fuel injector wiring harness. A lid is adapted to be mounted on the base, thereby securing the fuel injector wiring harness within the channel. A pair of locking structures extend outwardly from the base. Each locking structure includes a continuous outer wall which defines a cavity adapted to receive a mounting tab located on the fuel injector assembly. A locking lever is pivotally attached to each locking structure and has a locked position and a released position. The locking lever is biased in the locked position. The locking lever includes an integrally formed handle extending outwardly from the locking structure and an integrally formed projection which extends into the cavity.

5 Claims, 3 Drawing Sheets

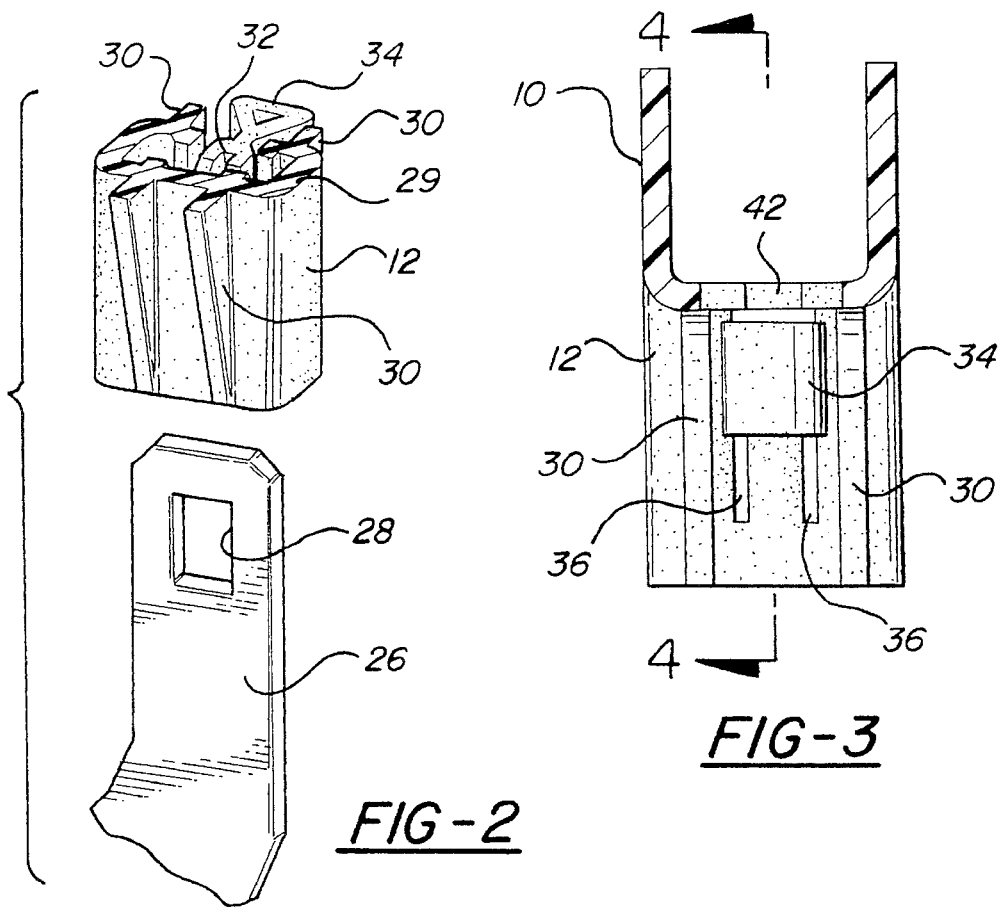
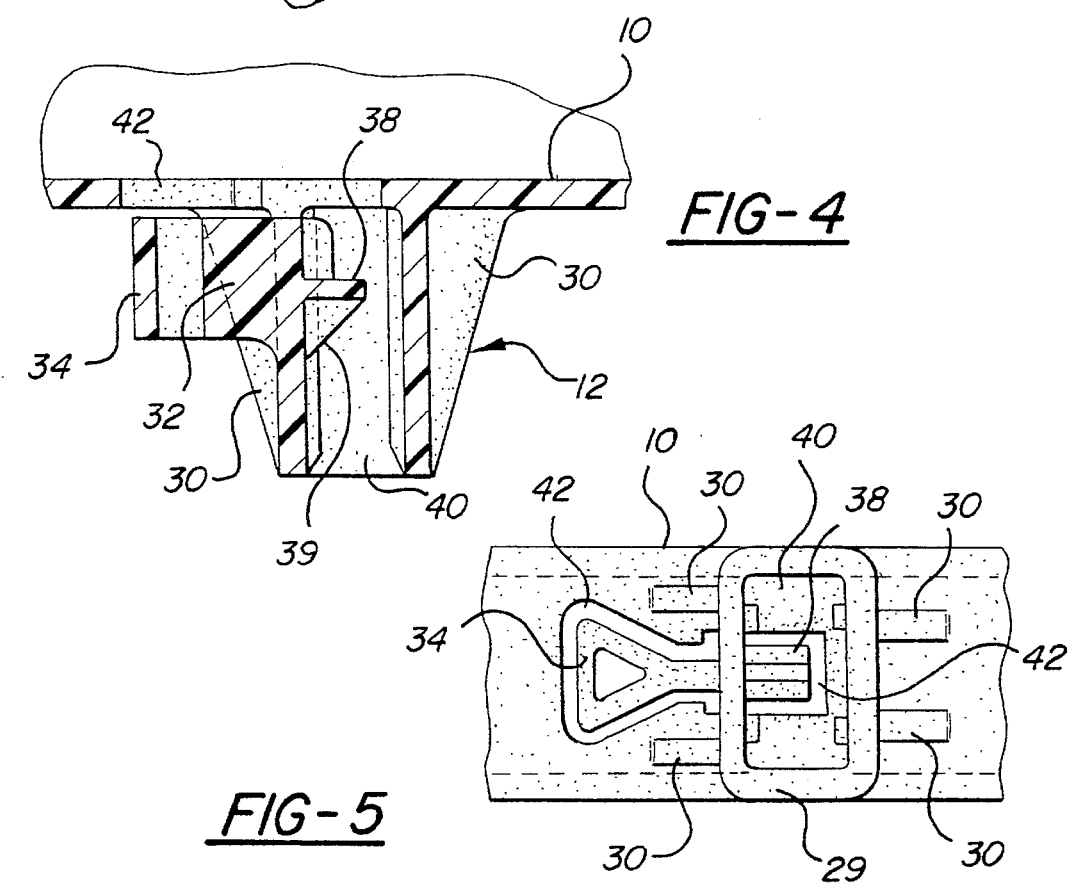

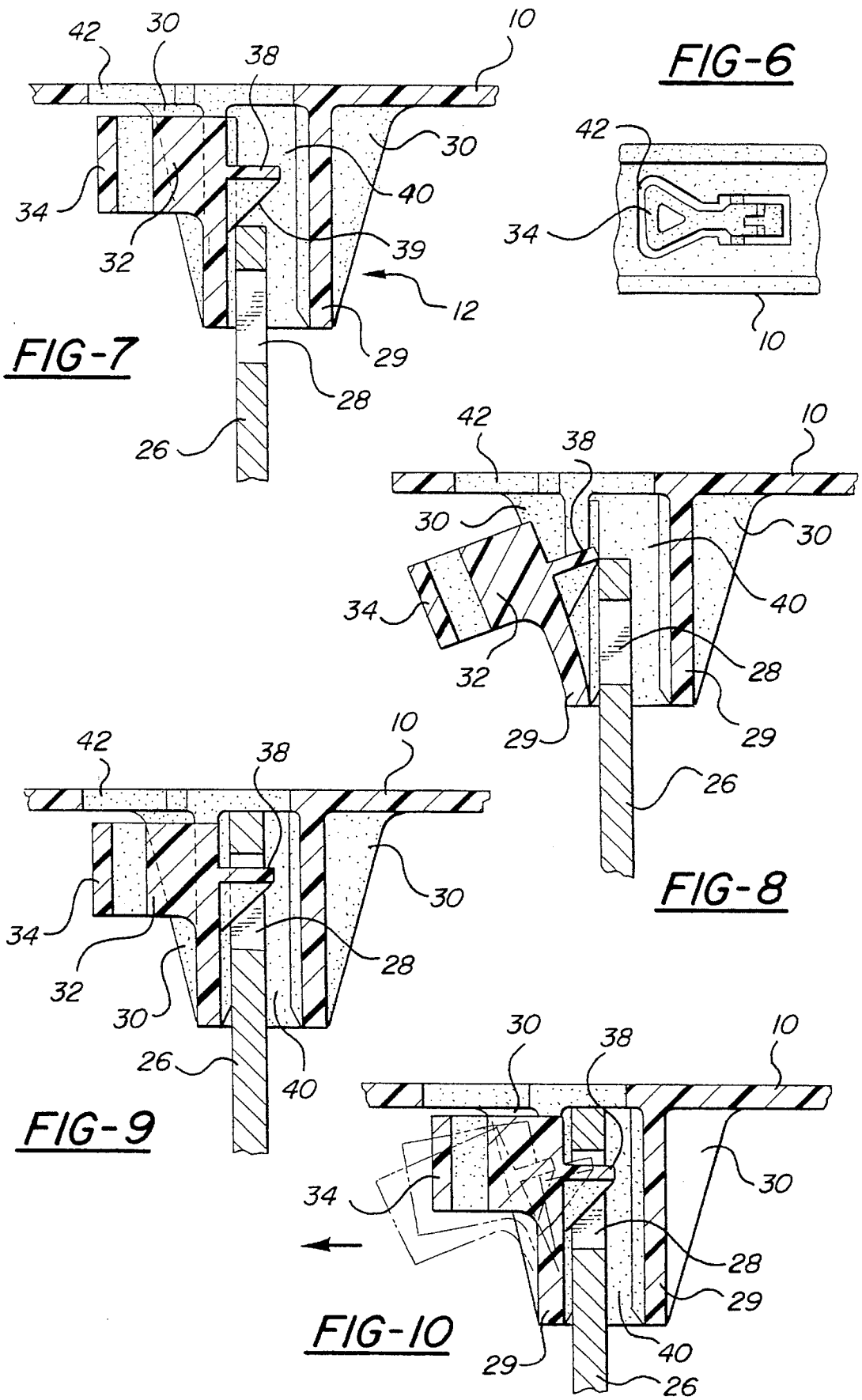

5,597,980

1

DETACHABLE MOUNTING MECHANISM FOR A FUEL INJECTOR WIRING HARNESS COVER

FIELD OF THE INVENTION

The present invention relates to a mounting mechanism for detachably mounting a fuel injector wiring harness cover to a fuel injector rail.

BACKGROUND OF THE INVENTION

Most automobiles manufactured today use a fuel injection system to distribute fuel into the engine's cylinders. These fuel injection systems include wiring harnesses which transmit electrical control signals to the fuel injectors. The wiring harnesses are located in the engine compartment of the automobile and are thus exposed to heat, water, dirt and other contaminants. The wiring harness is also subject to engine vibration as well as stress due to acceleration and deceleration of the vehicle. These forces threaten the integrity of the connections between the wires and the fuel injectors. Therefore, it is desirable to provide a cover which will protect the wiring harness from the conditions in the engine compartment and reduce the strains which are placed on the wiring harness connections.

To reduce movement of the wiring harness, the cover is preferably secured to a panel or component of the vehicle. Further, the cover is preferably detachable for repairing or servicing the fuel injectors or other vehicle components. Existing mounting systems use a locking structure which requires a special tool to release the lock mechanism. This tool can be difficult to operate in the confined spaces of the engine compartment. Repeated use of the release tool may damage the lock mechanism and reduce its locking effectiveness. If multiple lock mechanisms are used, removal becomes more difficult, requiring the locating of all lock mechanisms and properly releasing each lock mechanism with the tool.

SUMMARY OF THE INVENTION

The present invention provides a fuel injector wiring harness cover which is detachably mounted to a pair of tabs extending from a fuel injector rail. The cover includes a release mechanism which allows removal of the cover from the fuel injector rail without the use of tools. The release mechanism can be operated even when the mechanism is obstructed from view, i.e., by feel alone. The release mechanism may be repeatedly secured and released without damaging the mechanism or diminishing its ability to secure the cover to the fuel injector rail.

The cover protects the fuel injector wiring harness from heat, water, dirt and other contaminants in the engine compartment. The cover also minimizes the movement of the wiring harness caused by engine vibration and vehicle acceleration and deceleration. Minimizing the movement of the wiring harness reduces the risk of damaged connections between the wires and the fuel injectors.

The cover has a base which includes a channel to receive the fuel injector wiring harness. A lid is attached to the base and secures the wiring harness within the channel. The lid includes a plurality of locking arms which are inserted into corresponding locking slots formed on the base. The interaction of the locking arms with the locking slots secures the cover to the base. The base has a plurality of apertures for routing the fuel injector wiring harness into and out of the channel.

In the preferred form, a pair of mounting tabs are attached to the fuel injector rail and extend upwardly from the rail. Each mounting tab contains an aperture located near the free end of the tab.

A pair of locking structures extend perpendicularly downwardly from the bottom surface of the base. Each locking structure includes a continuous outer wall which defines a cavity having dimensions which permit a mounting tab to be inserted into the cavity. The locking structure further includes a locking lever which is pivotally attached to the outer wall of the locking structure. The locking lever may be pivoted between a released position and a locked position, and is biased in the locked position. The locking lever includes a handle projecting substantially perpendicularly therefrom for grasping by the user, allowing movement of the locking lever from the locked position to the released position. The handle is triangular in shape so as to be easily grasped and readily identified by feel if it cannot be seen by the user. The locking lever also contains a projection which extends into the cavity when the locking lever is in the locked position. When the locking lever is pivoted to the released position, the projection moves out of the cavity. The projection includes an angled cam surface along one side.

In operation, a wiring harness is placed in the channel of the base, and properly routed through the channel and apertures. Once the wiring harness is correctly routed, the lid is attached to the base, thereby securing the wiring harness within the channel. The interaction between the locking arms of the lid and the locking slots of the base secure the lid to the base.

To attach the cover to the fuel injector rail, the locking structures are aligned with the mounting tabs. The cover is then urged onto the mounting tabs. As the locking structures slide over the mounting tabs, the cam surface of the locking lever projection contacts the mounting tab, causing the projection to deflect toward the outer wall of the locking structure. As the projection is deflected toward the outer wall, the locking structures continue to slide over the mounting tabs. When the locking lever projection aligns with the aperture in the mounting tab, the locking lever automatically returns to the locked position. This secures the locking structure to the mounting tab and thereby secures the cover to the fuel injector rail.

To remove the cover, the user first grasps the handle of the locking lever and pulls the handle away from the locking structure. Pulling the handle pivots the locking lever away from the locking structure, causing the locking lever projection to move toward the outer wall and out of the mounting tab aperture. When the locking lever projection has moved out of the mounting tab aperture, the cover is pulled away from the mounting tab and is thereby released from the fuel injector rail. In the preferred form, the present invention positions the handles such that both handles may be grasped and released by a single user simultaneously.

BRIEF DESCRIPTION OF THE DRAWINGS

FIG. 2 is a perspective view showing a single cover locking mechanism and a single mounting tab;

FIG. 3 is an end view of the cover locking mechanism, as viewed along the axis of the locking lever;

FIG. 4 is a side cross-sectional view of the cover locking mechanism;

FIG. 5 is a bottom view of the cover locking mechanism, looking into the cavity opening;

FIG. 6 is a top view of the cover locking mechanism;

FIG. 7 is a side cross-sectional view of the cover locking mechanism as the cover is being attached to the mounting tabs;

FIG. 8 is a side cross-sectional view of the cover locking mechanism with the locking lever deflected;

FIG. 9 is a side cross-sectional view of the cover locking mechanism secured to the mounting tab; and FIG. 10 is a side cross sectional view showing the locking lever being moved to the released position.

DETAILED DESCRIPTION OF THE PREFERRED EMBODIMENT

Figure 1:
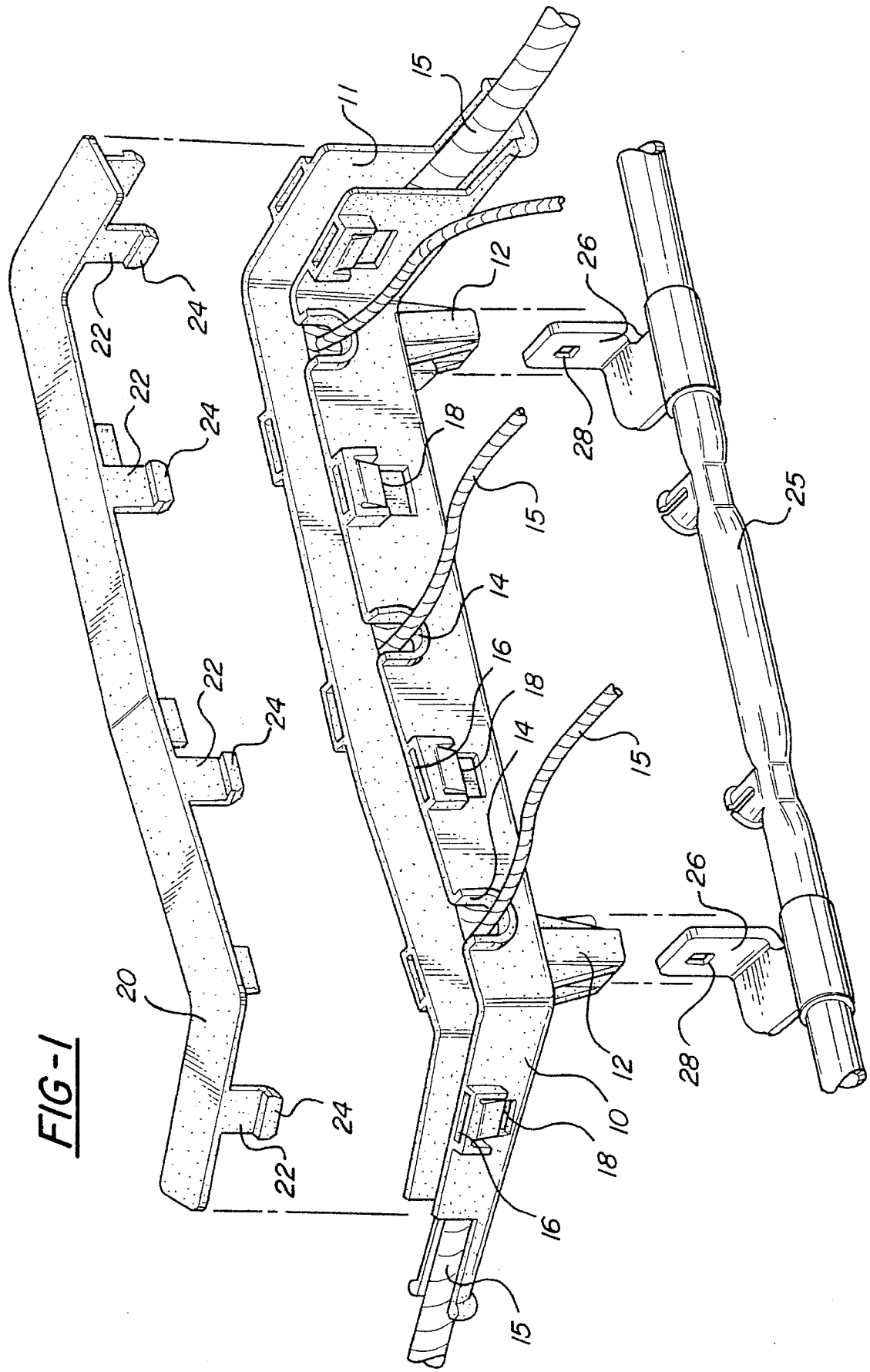
FIG. 1 is a perspective view of the wiring harness cover, fuel injector rail, and the mounting tabs.

A fuel injector wiring harness cover having a detachable mounting mechanism is illustrated in FIG. 1. The cover includes a base 10 which has a channel 11 running lengthwise through the base. In the preferred embodiment, base 10 contains a pair of locking structures 12 which secure the base to a pair of mounting tabs 26. However, it will be understood that base 10 may use any number of locking structures 12 and corresponding mounting tabs 26 to secure the base to the mounting tabs.

Base 10 also includes a plurality of U-shaped apertures 14 located on one side of the base. Apertures 14 and channel 11 are used to route a wiring harness 15 through the cover and to the fuel injectors (not shown). In the preferred embodiment, three apertures 14 are provided, but the number of apertures may vary depending on the particular application. In an alternate embodiment, apertures 14 may be located on both sides of base 10.

A lid 20 is contoured to cover channel 11 in base 10. Lid 20 has a plurality of locking arms 22 extending outwardly from the lid. Each locking arm 22 has a projection 24 formed at its distal end. Base 10 includes a plurality of locking slots 16 formed on the outer surface of the base. Locking slots 16 are positioned to receive locking arms 22 on lid 20. Locking slots 16 have an edge 18 which interacts with locking arm projection 24 to secure lid 20 to base 10, thereby securing fuel injector wiring harness 15 within channel 11. To remove lid 20 from base 10, a flat blade tool (not shown) is used to release locking arm 22 from locking slot 16. Although a particular locking bayonet-type mechanism has been disclosed for securing lid 20 to base 10, it should be understood that other locking mechanisms may be used which are commonly known in the art.

Each mounting tab 26 contains an aperture 28. In the preferred form, mounting tabs 26 are attached to fuel injector rail 25. However, mounting tabs 26 may also be attached to a vehicle body panel or other vehicle component.

Referring to FIG. 2, locking structure 12 includes a continuous outer wall 29 and four triangular ribs 30 which function to strengthen the locking structure. As best seen in FIG. 3, a pair of substantially parallel slits 36 are formed in outer wall 29, the slits defining therebetween a locking lever 32. Locking lever 32 is pivotally attached at its lower end to outer wall 29 and is free at its upper end proximate base 10. Locking lever 32 can be pivoted between a locked position and a released position, as shown in FIG. 10. Locking lever 32 is biased in the locked position. A handle 34 is integrally molded with locking lever 32 and extends substantially perpendicularly from the locking lever and parallel with the bottom surface of channel 10. Handle 34 permits the locking lever to be pivoted from the locked position to the released position. Handle 34 is generally triangular in shape, one of the vertices of the triangle being attached to locking lever 32, to provide a shape that may be firmly grasped between two fingers. The triangular shape is also tactilly cognizable, i.e., an operator can recognize the handle by feel when the handle is not visible because of its position below the cover, and so can be positive that he/she is grasping the proper portion of the latch mechanism.

Referring to FIG. 4, a side view of locking structure 12 is shown. Locking structure 12 contains a cavity 40 which opens downwardly as viewed in FIG. 4. Cavity 40 creates an opening which is slightly larger than mounting tab 26, thereby allowing the mounting tab to slide into the cavity. A projection 38 is integrally molded to locking lever 32 and extends into cavity 40 when the locking lever is in the locked position. Projection 38 includes a cam surface 39 along the lower side of the projection. Projection 38 is positioned such that when locking lever 32 is pivoted to the released position, projection 38 moves out of cavity 40 and aligns with outer wall 29, as shown in FIG. 10.

As is best seen in FIGS. 5 and 6, a hole 42 is formed in the bottom surface of channel 11 directly above locking lever 32 and handle 34. Hole 42 provides access to handle 34 from the inside of channel 11 and allows an operator to actuate the locking lever to the release position by inserting a finger through the hole and pressing downwardly on the handle. In the preferred embodiment of the invention, hole 42 is directly aligned with handle 34, locking lever 32 and projection 38 This permits those components to be molded integrally with the cover 10 using a die tool.

In operation, a fuel injector wiring harness 15 is positioned in channel 11 of base 10. Wiring harness 15 is routed through channel 11 and the appropriate apertures 14. The particular routing of wiring harness 15 depends on the location of base 12 with respect to the fuel injectors and other vehicle components. After wiring harness 15 is properly routed within base 10, lid 20 is attached to the base, securing the wiring harness within the base. Locking arms 22 on lid 20 are urged into locking slots 16 and engage edges 18 to secure lid 20 to base 10.

To secure the cover to the fuel injector rail, locking structures 12 are aligned with mounting tabs 26. Locking structures 12 are then urged downwardly onto mounting tabs 26. As shown in FIG. 7, cam surface 39 of projection 38 contacts mounting tab 26. As locking structure 12 is urged onto mounting tab 26, cam surface 39 slides along tab 26, causing projection 38 to deflect toward outer wall 29, as shown in FIG. 8. The deflection of projection 38 causes locking lever 32 to pivot from the locked position toward the released position. As projection 38 is further deflected, mounting tab 26 passes the projection and continues into cavity 40. As mounting tab 26 slides into cavity 40, aperture 28 in the mounting tab will align with locking lever projection 38. At this point, the biasing force of locking lever 32 will cause projection 38 to enter aperture 28, and the locking lever will return to the locked position, as shown in FIG. 9. With locking lever 32 in the locked position, the cover is secured to mounting tab 26. The interaction between locking lever projection 38 and aperture 28 prevents the cover from disengaging mounting tab 26.

To remove the cover from the fuel injector rail, the operator uses handle 34 located on locking lever 32. Handle 34 is of such size and shape that it can be readily located by feel and grasped on opposite sides using two fingers, such as a thumb and forefinger. The operator grasps handle 34 and pulls the handle away from locking structure 12. This causes locking lever 32 to pivot from the locked position toward the released position, as shown in FIG. 10. When locking lever 32 is pulled to the released position, projection 38 is no longer in aperture 28 and, instead, aligns with outer wall 29. While locking lever 32 is held in the released position by the operator, the cover may be removed by pulling the cover away from mounting tab 26. Once the cover has been removed from mounting tab 26, handle 34 may be released.

In the event that, due to congestion in the area in which cover 10 is mounted, it is not possible for the operator to reach handle 34 by reaching underneath the cover, the operator may remove wiring harness 15 from channel 11 and move the handle to the released position by inserting a finger through hole 42.

In the preferred embodiment, base 10, locking structures 12 and lid 20 are manufactured from a plastic material such as polypropylene. Mounting tabs 26 are preferably manufactured from a metal such as steel.

In the preferred embodiment, two mounting tabs 26 and two corresponding locking structures 12 are used. Mounting tabs 26 are positioned approximately eight inches apart and are welded to the fuel rail. Similarly, locking structures 12 are positioned approximately eight inches apart. Handles 34 are oriented such that the operator can simultaneously grasp one handle with each hand. Thus, in a single operation, the operator can grasp and release each handle 34 while pulling the cover away from mounting tabs 26.

If mounting tabs 26 and corresponding locking structures 12 are positioned such that they cannot be released simultaneously, the operator will need to perform a separate operation to release each locking structure 12. The operator grasps one handle 34, releases locking lever 32 and pulls the locking structure away from mounting tab 26. In this situation, the operator may need to support the released end to prevent it from reattaching itself to the mounting tab while the other locking structure is removed. Finally, the operator grasps the second handle 34, releases locking lever 32 and pulls the cover away from mounting tabs 26.

Although a particular embodiment of the present invention has been described as used with a fuel injector wiring harness, it will be understood that the mounting mechanism may also be used with any structure requiring a detachable mounting mechanism.

I claim:

1. A cover for a fuel injector wiring harness, the cover detachably mountable to first and second mounting tabs, each of the mounting tabs having an aperture, the cover comprising:

a base having a channel for receiving the fuel injector wiring harness, the channel having a bottom surface;

a lid attachable to the base for securing the fuel injector wiring harness within the channel;

first and second locking structures extending substantially perpendicularly from the channel bottom surface in spaced, parallel relationship with one another, each of the locking structures defining a cavity having an opening for receiving one of the mounting tabs;

first and second manually actuable locking levers formed integrally with the respective first and second locking structures, each of the locking levers pivotable with respect to the locking structure between a locked position and a released position, each of the locking levers having a projection extending into the respective cavity and engagable with the respective aperture when the respective mounting tab is received within the respective cavity and the locking lever is in the locked position; and first and second handle portions extending substantially perpendicularly from respective first and second locking levers and substantially parallel with the channel bottom surface, each of the handle portions having a first end attached to the locking lever and a distal end, the distal end being wider than the first end.

2. A fuel injector wiring harness cover according to claim 1 wherein each of the handle portions is in the shape of a triangle and is attached at its vertex to the respective locking lever.

3. A fuel injector wiring harness cover according to claim 1 further comprising:

first and second holes formed in the channel bottom surface in proximity to the first and second locking levers respectively, whereby the first and second handle portions are accessible through the respective first and second holes for actuation of the locking levers to the unlocked positions.

4. A fuel injector wiring harness cover according to claim 3 wherein the first and second holes are in alignment with the respective handle portions and are shaped to match the shape of the respective handle portions.

5. A fuel injector wiring harness cover according to claim 1 wherein each of the first and second locking structures comprises an outer wall defining the respective cavity, each of the outer walls having first and second spaced slits formed therein, and each of the locking levers being disposed substantially between respective first and second slits.

* * * * *